(12) United States Patent
Harrington

(10) Patent No.: US 7,379,207 B2
(45) Date of Patent: May 27, 2008

(54) METHOD AND SYSTEM FOR DEVICE-INDEPENDENT COLOR GAMUT MAPPING

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 901 days.

(21) Appl. No.: 10/757,129

(22) Filed: Jan. 14, 2004

(65) Prior Publication Data
US 2005/0151983 A1    Jul. 14, 2005

(51) Int. Cl.
H04N 1/60    (2006.01)

(52) U.S. Cl. .................. 358/1.9; 358/518; 358/520

(58) Field of Classification Search ............... 358/1.9, 358/2.1, 518–523, 527, 530, 537–538, 452–462, 358/3.24; 382/162, 167; 345/589–591, 345/593–594, 600–605
See application file for complete search history.

(56) References Cited

U.S. PATENT DOCUMENTS

| | | |
|---|---|---|
| 4,670,780 A | 6/1987 | McManus et al. |
| 4,751,535 A | 6/1988 | Myers |
| 4,812,902 A | 3/1989 | Fuchsberger |
| 4,839,721 A | 6/1989 | Abdulwahab et al. |
| 4,941,038 A | 7/1990 | Walowit |
| 5,012,333 A | 4/1991 | Lee et al. |
| 5,107,332 A | 4/1992 | Chan |
| 5,185,661 A | 2/1993 | Ng |
| 5,450,216 A | 9/1995 | Kasson |
| 5,704,021 A | 12/1997 | Smith et al. |
| 5,706,410 A | 1/1998 | Bagley et al. |
| 5,710,827 A | 1/1998 | Perumal, Jr. et al. |
| 5,734,802 A | 3/1998 | Maltz et al. |
| 5,872,895 A * | 2/1999 | Zandee et al. ............... 358/1.9 |
| 6,744,534 B1 * | 6/2004 | Balasubramanian et al. .. 358/1.9 |
| 6,954,288 B2 * | 10/2005 | Uekusa et al. ............... 358/1.9 |

(Continued)

FOREIGN PATENT DOCUMENTS

EP    1 439 691 A1    7/2004

(Continued)

OTHER PUBLICATIONS

Communication—European Search Report in European Patent Application No. 05 100 208.7-1228 dated Jul. 4, 2007.

*Primary Examiner*—Scott A. Rogers
(74) *Attorney, Agent, or Firm*—Gunnar G. Leinberg; Nixon Peabody LLP

(57) ABSTRACT

System and method for device-independent color gamut mapping is disclosed. The system recognizes that a finite set of color gamut mapping intents form the basis for performing color gamut mappings during document rendering and implements a color mapping method for each of the color gamut mapping intents. For each color in a document to be rendered, the system obtains a desired color gamut mapping strategy expressed as a combination of the color gamut mapping intents and performs each of the color mapping methods on each color to obtain basis color maps for each color. The system then constructs a mapped color for each of the colors in the document based on the desired color gamut mapping strategy associated with each color. Furthermore, weight values may be used to further define the combination in the desired color gamut mapping strategy.

27 Claims, 4 Drawing Sheets

U.S. PATENT DOCUMENTS

| | | |
|---|---|---|
| 7,019,755 B2 * | 3/2006 | Krueger et al. ............. 345/589 |
| 7,054,035 B2 * | 5/2006 | Zeng et al. ................. 358/1.9 |
| 7,079,284 B2 * | 7/2006 | Kawakami et al. .......... 358/1.9 |
| 7,161,710 B1 * | 1/2007 | MacLeod .................... 358/1.9 |
| 7,227,666 B1 * | 6/2007 | MacLeod .................... 358/1.9 |
| 2001/0013953 A1 | 8/2001 | Uekusa et al. |
| 2007/0008558 A1 * | 1/2007 | Rumph et al. ............... 358/1.9 |
| 2007/0183656 A1 * | 8/2007 | Kuwahara et al. .......... 382/162 |

FOREIGN PATENT DOCUMENTS

WO     WO 96/10239     4/1996

* cited by examiner

METHOD AND SYSTEM FOR DEVICE-INDEPENDENT COLOR GAMUT MAPPING

FIELD

This invention relates generally to color gamut mapping and, more particularly, to a method and system for mapping color information associated with an input color gamut to an output color gamut according to a specified linear combination of color preservation intentions that are achieved by a rendering device using the device's own color gamut mapping methods.

BACKGROUND

Currently, documents are created with ideal color specifications. These are the colors that are desired, whether or not a presentation device can produce them. If the presentation device cannot produce these colors, then the device must map the colors to other colors that the device can produce. Sometimes documents include information which indicates the document creator's intentions for preserving particular color attributes when the colors in the document must be mapped, but this information is typically very limited. Thus, the document creator often has very little control over the mapping process. As a result, documents are being produced which do not accurately reflect the document creator's true intentions, such as which or how particular attributes of the original colors in the document should be preserved when colors are mapped to a rendering device's color gamut.

SUMMARY

A method and a program storage device readable by a machine and tangibly embodying a program of instructions executable by the machine in accordance with embodiments of the present invention include defining a finite set of document rendering intents as a basis for document rendering, expressing at least one desired document rendering strategy where each strategy includes a first linear combination of the document rendering intents, and associating the at least one desired document rendering strategy with at least one rendering decision associated with a document.

A system in accordance with embodiments of the present invention includes a document rendering intention system that defines a finite set of document rendering intents as a basis for document rendering. A rendering intention expression system expresses at least one desired document rendering strategy where each strategy includes a linear combination of the document rendering intents. An intention matching system then associates the at least one desired document rendering strategy with at least one rendering decision associated with a document.

The present invention recognizes that different objects and/or regions of a document may have different color gamut mapping intentions, and that a color gamut mapping scheme should be chosen to match. The present invention proposes that a desired color gamut mapping scheme can almost always be built as a blend of a small or finite number of color gamut mapping strategies to preserve a document creator's color gamut mapping intent. To accomplish this, the present invention further proposes that the details of the methods or algorithms used to implement these color gamut mapping strategies not be provided to the rendering devices. The embodiments of the present invention provide a number of advantages, including providing document creators with more control over how their documents are rendered in a device-independent manner. The intentions of the document creator with regard to how the original colors in the document should appear when they are color mapped regardless of the particular devices subsequently rendering the document are easily expressed and observed. Moreover, the embodiments enable document creators to more precisely specify their document processing intentions.

DETAILED DESCRIPTION

Figure 1:
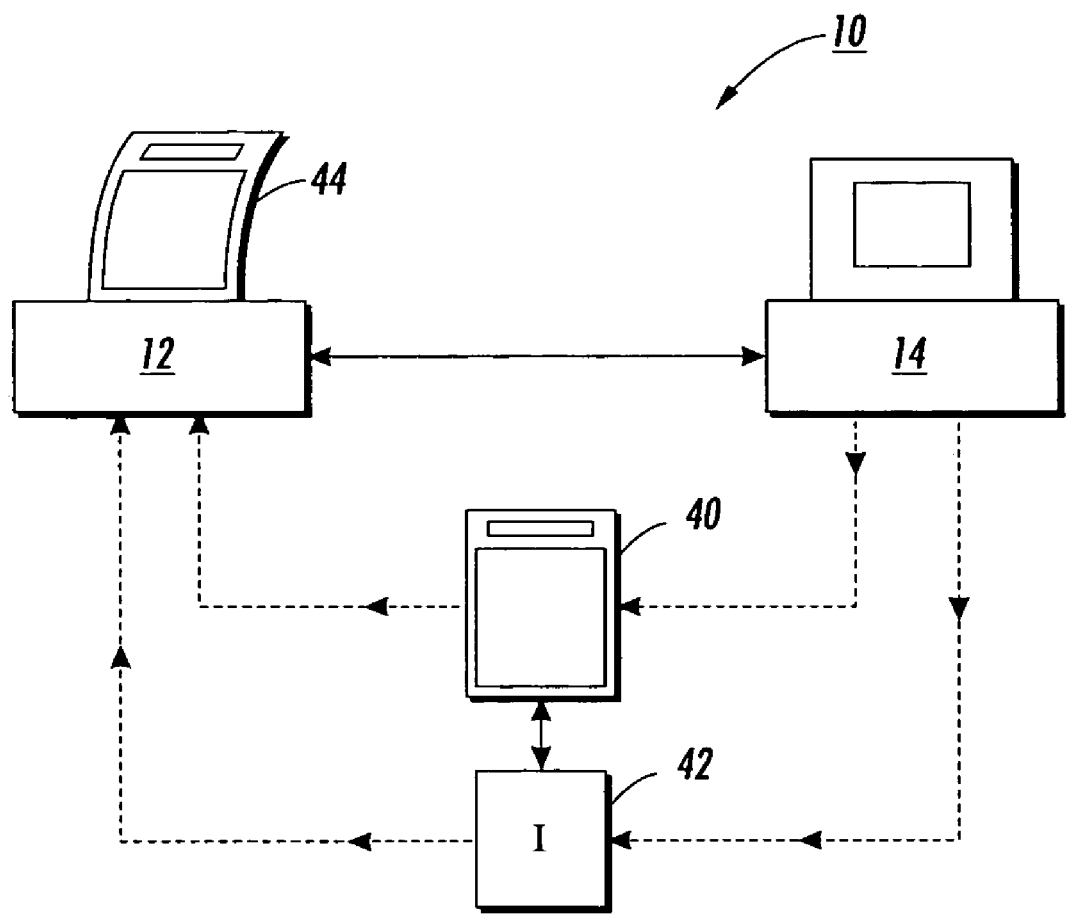
FIG. 1 is a functional block diagram of a system for device-independent color gamut mapping in accordance with embodiments of the present invention.
Figure 3:
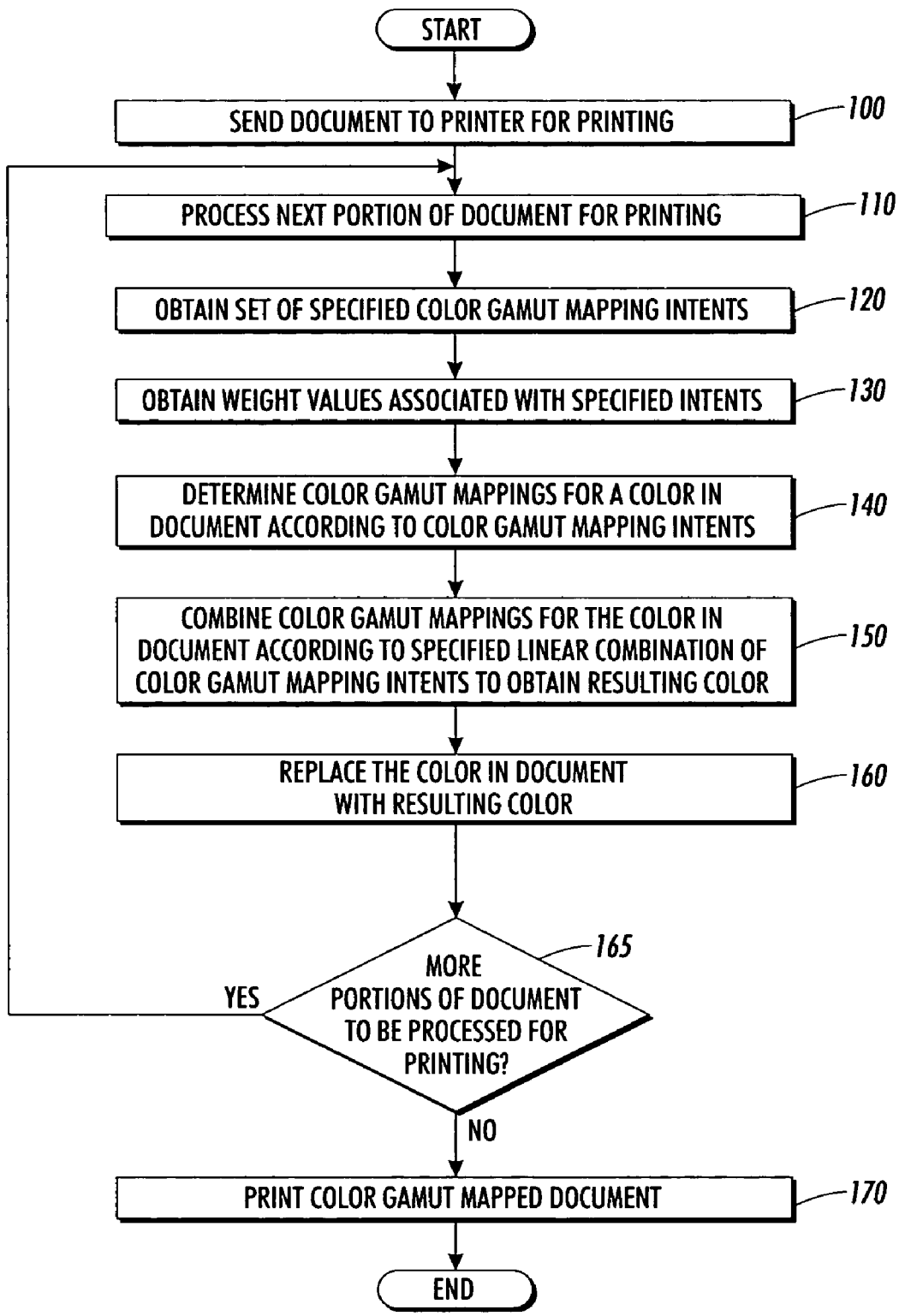
FIG. 3 is a flow chart of a process for device-independent color gamut mapping in accordance with embodiments of the present invention.

A system 10 and method for device-independent color gamut mapping in accordance with embodiments of the present invention are shown in FIGS. 1 and 3. In embodiments of the present invention, system 10 includes a printer 12 in communication with a computer 14, although the system 10 can include a lesser or greater number of devices. The printer 12 maps first colors in a document 40 to second colors that are within the color gamut of the printer 12 using a set of color mapping techniques to obtain a set of second colors for each first color, and then combines the second colors for each first color based on a specified linear combination of color gamut mapping intents included in an intent file 42, for example, to obtain a blended color result for each first color. The printer 12 may then print a color blended document 44 with the blended color results substituted for the first colors from the document 40. The system 10 and method for device-independent color gamut mapping offers a number of advantages, including providing document creators with more control over how documents 40 are rendered in a device-independent manner. As a result, color mapped documents 44 can be rendered with colors which more closely resemble their originally intended colors according to the document creator's intent.

Figure 2:
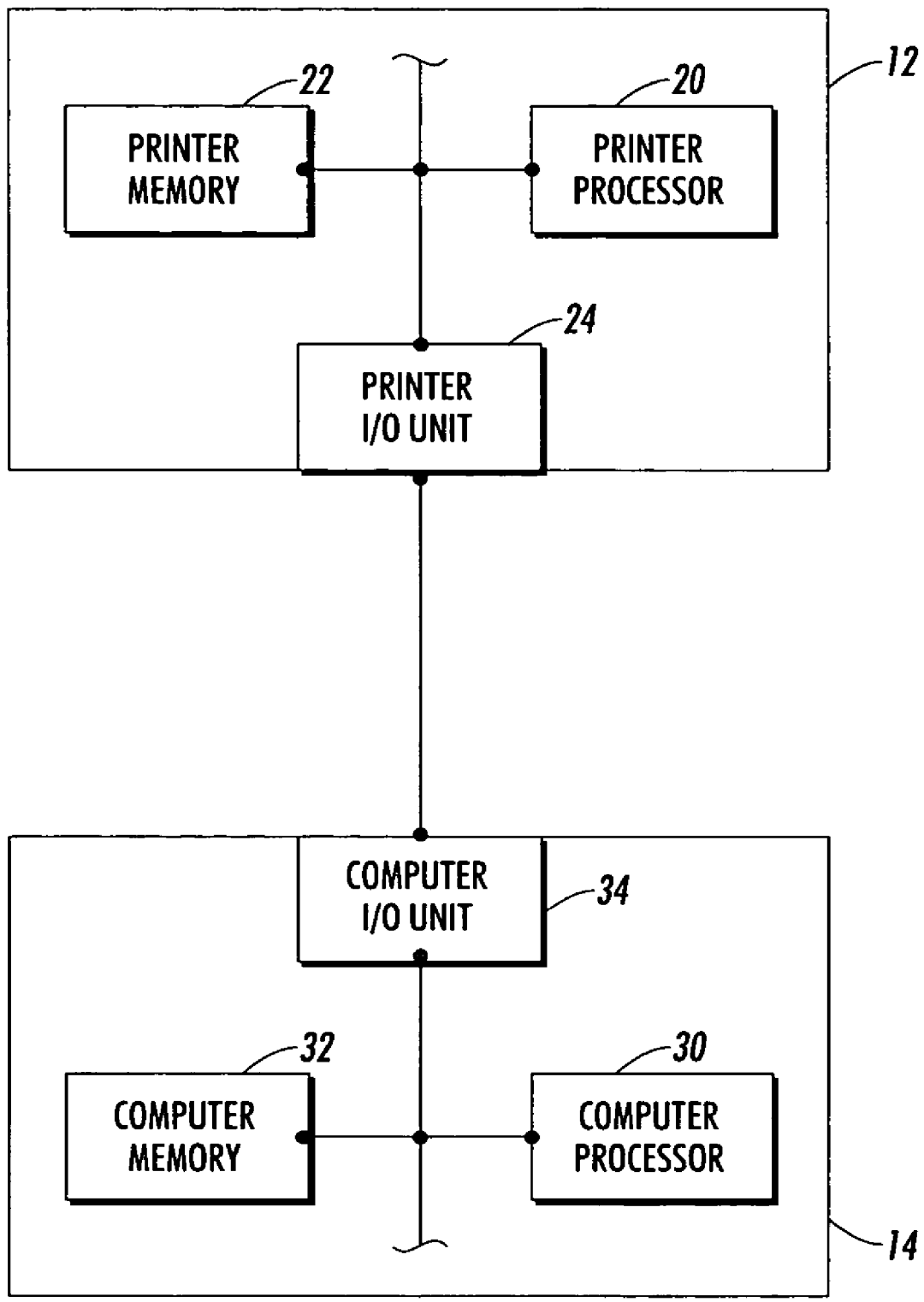
FIG. 2 is a block diagram of the system for device-independent color gamut mapping shown in FIG. 1.

Referring to FIGS. 1-2, the printer 12 and computer 14 are communicatively coupled to each other by a hard-wire connection over a local area network, although a variety of communication systems and/or methods using appropriate protocols can be used, including a direct connection via serial or parallel bus cables, a wide area network, the Internet, modems and phone lines, wireless communication technology, and combinations thereof.

The printer 12 is provided for exemplary purposes only and may comprise other devices, such as a copier system or a display device (e.g., CRT, LCD or plasma display devices). In embodiments of the present invention, the printer 12 includes a printer processor 20, a printer memory 22 and a printer I/O unit 24, which are coupled together by one or more bus systems or other communication links, although the printer 12 can comprise other elements in other arrangements. The printer processor 20 executes a portion of the instructions for device-independent color gamut mapping in accordance with embodiments of the present invention as described herein and illustrated in FIG. 3, although the processor 20 may perform other types of functions. The instructions may be expressed as executable programs written in a number of conventional or later developed programming languages that can be understood and executed by the printer processor 20.

The instructions are stored in the printer memory 22 for execution by the printer processor 20, although some or all of these instructions and data may be stored elsewhere, such as the computer 14. In embodiments of the present invention, a portion of these instructions are executed by the printer processor 20 for implementing standard color gamut mapping methods to achieve several color gamut mapping strategies (e.g., calorimetric, hue, luminance, and solid/saturation preserving mapping strategies) described further herein. The printer memory 22 comprises a variety of different types of memory storage devices, such as random access memory ("RAM") or read only memory ("ROM") in the printer 12, and/or a floppy disk, hard disk, CD-ROM or other computer readable medium which is read from and/or written to by a magnetic, optical, or other reading and/or writing system coupled to the printer processor 20. The printer I/O unit 24 enables the printer 12 to communicate with the computer 14 by way of the hard-wire connection mentioned above.

The computer 14 is provided for exemplary purposes only and may comprise other devices, such as a server, a laptop computer, a personal digital assistant or a cellular telephone. In embodiments of the present invention, the computer 14 includes a computer processor 30, a computer memory 32, a computer I/O unit 34, and a user input system (not illustrated), which are coupled together by one or more bus systems or other communication links, although the computer 14 can comprise other elements in other arrangements. The computer processor 30 executes a portion of the instructions for device-independent color gamut mapping in accordance with embodiments of the present invention as described herein and illustrated in FIG. 3, although the processor 30 may perform other types of functions. The instructions may be expressed as executable programs written in the same types of programming languages understood by the printer 12, although other types of programming languages can used.

The instructions are stored in the computer memory 32 for execution by the computer processor 30, although some or all of these instructions and data may be stored elsewhere, such as the printer memory 22. The computer memory 32 is the same type of memory as the printer memory 22, although other types of memory may be used. The computer I/O unit 34 enables the computer 14 to communicate with the printer 12 by way of the hard-wire connection mentioned above. Further, the user input system, such as a keyboard and a mouse, enables an operator to generate and transmit signals or commands to the computer processor 30, such as a request for rendering the document 40 on a particular device, such as the printer 12.

Figure 4:
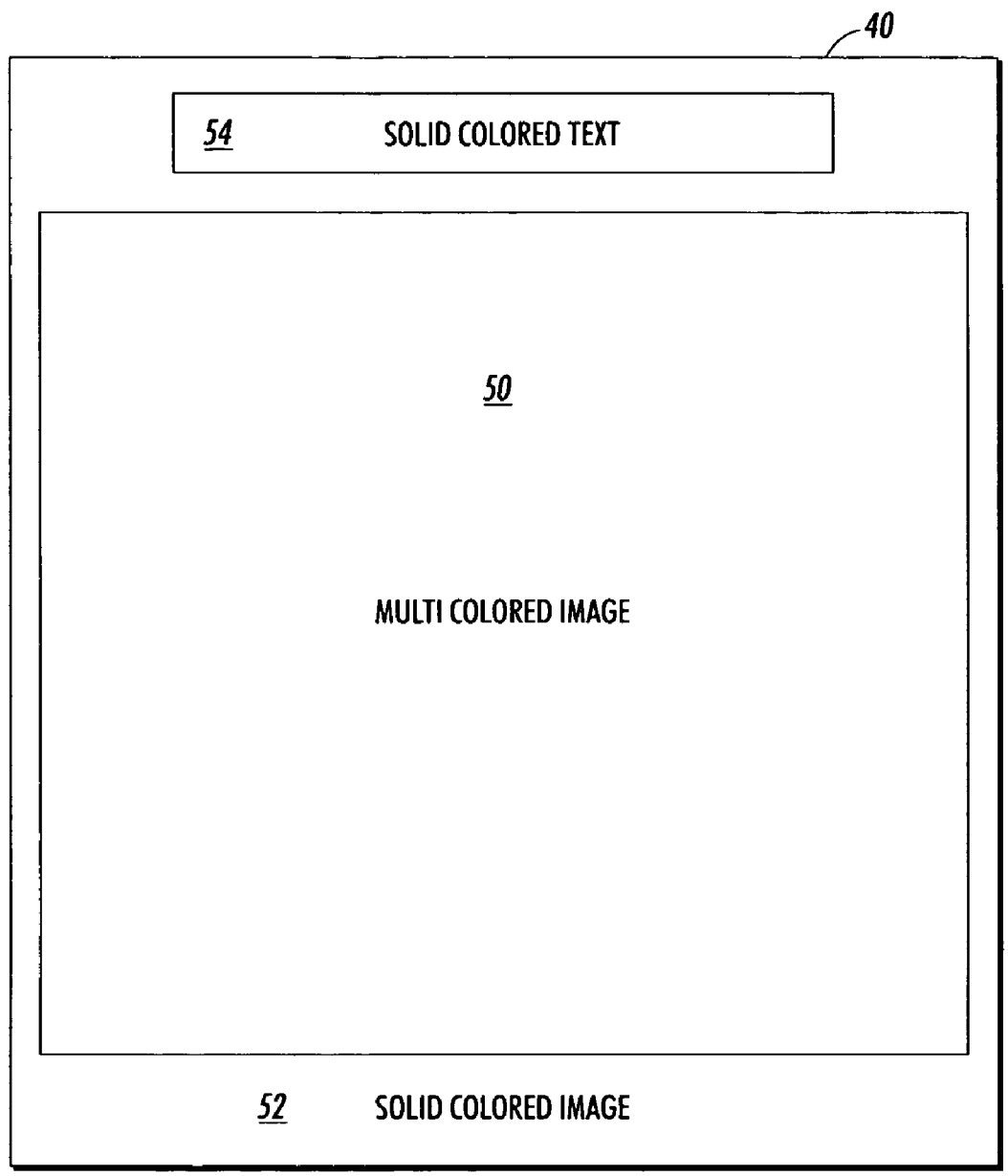
FIG. 4 is a diagram of an exemplary document used in the system for device-independent color gamut mapping shown in FIG. 1.

The operation of the system 10 for device-independent color gamut mapping in accordance with embodiments of the present invention will now be described with reference to FIGS. 1, 3 and 4. Referring to FIG. 3 and beginning at step 100, by way of example only, a user operating computer 14 generates a document 40 shown in FIG. 4, although the document 40 may already be stored in the computer memory 32 or elsewhere, or another device may send the document 40 to the computer 14. The document 40 is provided for exemplary purposes only and includes several objects, such as a multi colored image object 50, a solid colored border object 52, and a solid colored text object 54, although the document 40 may include a greater or lesser number of objects. The operator of the computer 14 uses the computer's user input system to request and cause the computer to send the document 40 to the printer 12 to be printed.

The computer 14 also provides an intent file 42 to the printer 12. In embodiments of the present invention, the intent file 42 comprises a text file, for example, which includes one or more sets of specified color gamut mapping intents, although the intents may already be stored in the printer memory 22 or elsewhere, the intents may be included as comments in a job descriptor language ("JDL") stream sent to the printer 12 along with the document 40, the intents may be embedded in the document 40 as a Postscript® field where the document 40 is in a "tiff" file format, for example, or the weights may be encoded as an attribute value where the document is written in an "XML" format, for example. In embodiments of the present invention, each of the color gamut mapping intents included in the intent file 42 corresponds to a particular color gamut mapping strategy, such as a calorimetric preserving mapping strategy, a hue preserving mapping strategy, a luminance preserving mapping strategy and a solid/saturation preserving mapping strategy, although other color mapping strategies may be used.

Basically, these color gamut mapping intents express different intentions with respect to preserving attributes or characteristics of the colors in the document 40 regardless of the particular device or methods used by the device to perform the color gamut mapping. For instance, the intent behind the colorimetric mapping strategy, sometimes referred to as "gamut clipping," is to preserve the specified ideal colors in the document 40 as closely as possible. Colors in the document 40 that are within the color gamut of a device, such as the printer 12, are simply rendered without any further changes, but colors that fall outside of the color gamut for the printer 12 are mapped to the closest color within the color gamut of the printer 12, although variations include mapping colors outside of the printer 12 color gamut to the nearest color in the color gamut of the printer 12 while preserving hue, or mapping to a color along a vector towards the center of the printer 12 color gamut.

The intent behind the hue preserving mapping strategy, sometimes referred to as "gamut compression," is to preserve the relationship between colors and their hue in the document 40. Several methods may be implemented by devices, such as the printer 12, to achieve this goal, such as scaling of the luminance, hue-preserving gamma adjustments and centroid scaling. The intent behind the luminance preserving mapping strategy is to preserve the luminance of the colors in the document 40. Colors outside the color gamut of the printer 12 are mapped to the outer boundary of the printer's color gamut in a luminance preserving way, although variations include whether or not to preserve hue and other variations. This color mapping strategy is most useful for regions of high spatial frequency within an image (e.g., edges and textures) where most of the image information is typically in the luminance channel. The intent behind the solid/saturation preserving mapping strategy is to preserve the solid ink coverage properties of color in the document 40 so that no areas of un-inked paper are produced within color mapped saturated colors by halftoning, for example. Strongly saturated colors in the document 40 are mapped into strongly saturated colors within the color gamut of the rendering device, such as the printer 12.

At step 110, the printer 12 processes the next portion of the document 40 for printing according to standard document rendering techniques, such as rasterization where image data in the form of a page description language (e.g., Postscript®) describes the document. During this processing, the printer 12 selects a first color defined in the image data embodying the document 40 as it is encountered for further processing as described below at steps 120-165.

At step 120, the printer 12 obtains a set of a specified linear combination of the color gamut mapping intents from the intent file 42. In embodiments of the present invention, each set of specified color gamut mapping intents expressed in the intent file 42 is associated with one or more of the objects 50, 52, 54 in the document 40 that is associated with a color being processed, although one set of intents may be associated with the entire document 40, the same or different sets of intents may be associated with one or more positions (e.g., pixels) or particular color specifications (e.g., R, G, B values) in the document 40, or the sets of intents may be associated with particular color specifications at particular positions in the document 40. In this example, the first color being processed happens to be from the object 50, and thus the printer 12 obtains the set of the specified linear combination of color gamut mapping intents associated with the object 50 from the intent file 42.

Further, the one or more sets of specified color gamut mapping intents are expressed in the intent file 42 as text strings, for example, specifying a linear combination of the above-described color gamut mapping strategies that should be employed by the device, printer 12 in this example, during color gamut mapping whenever color mapping decisions are required. Furthermore, each of the intents in this example are specified along with corresponding weight values which have a sum of 1 (other values and scalings may be used, such as weight values having a sum of 255, and fewer than four values may be specified where the fourth value is determined by subtracting the sum of three specified values from 1 or some other scaling), although the intents may instead be specified along with corresponding Boolean values or the intents which are desired to be adhered to may be specified without any value while the undesired intents are simply omitted. By providing the weight values for each of the specified intents, however, greater control over color gamut mapping is afforded.

By way of example only, the creator of the document 40 may have decided that preserving the ideal color specifications and the hue of the original colors in the multi colored image object 50 of document 40 during color gamut mapping are the most important color gamut mapping strategies, but that preserving the luminance or the saturation of the colors within the multi colored image object 50 in the document 40 is not as important. Therefore, the following exemplary string may have been included in the intent file 42 and associated with object 50: "colorimetric preserving mapping strategy=0.90; hue preserving mapping strategy=0.10; luminance preserving mapping strategy=0; solid/saturation preserving mapping strategy=0." Further in this example, the document creator may have decided that preserving the ideal color specifications, preserving the hue, preserving the luminance and preserving the solid/saturation attributes of the original colors in the remaining objects 52, 54 of document 40 are equally important. Thus, the following exemplary string may have been included in the intent file 42 for each of the remaining objects 52, 54 in the document 40: "colorimetric preserving mapping strategy=0.25; hue preserving mapping strategy=0.25; luminance preserving mapping strategy=0.25; solid/saturation preserving mapping strategy=0.25."

At step 130, the printer 12 extracts the set of mapping weights (i.e., 0.90, 0.10, 0, 0) corresponding to each of the intents (i.e., calorimetric, hue, luminance and solid/saturation preservation) in the set of the specified linear combination of color gamut mapping intents associated with the first color from the object 50 that was obtained at step 120.

At step 140, the printer 12 color maps the first color from the particular portion of the document 40 being processed, such as the object 50, for example, according to the printer 12's specific implementation of its color gamut method(s). At this point in the process, conceptually, the printer 12 does not take into account any specified linear combination of the color gamut mapping intents that are included in the intent file 42 for the particular portion of the document 40 being processed. The printer 12 simply generates the second colors which are in the printer's color gamut and which observe each of the color gamut mapping intents that are known to the printer. For instance, the printer 12 maps the first selected color to second colors within the printer's color gamut in accordance with the colorimetric, hue, luminance and solid/saturation preserving mapping strategies employing specific color mapping instructions implemented by the printer 12, and stores a value (e.g., R, G, B) representing each color mapped second color in the printer memory 22 for further processing as described below at step 150.

At step 150, the printer 12 applies the set of the specified linear combination of the color gamut mapping intents obtained at step 120 to each of the color mapped second colors obtained at step 140 to determine a blended color value. For instance, at step 140 the printer 12 determines the following exemplary R, G, B values shown below in Table 1 for each of the resulting color mapped second colors, although other values besides R, G, B values may be used, such as C, M, Y, K values:

TABLE 1

| Color gamut mapping strategies | Color mapped second color R, G, B values |
|---|---|
| colorimetric mapping strategy | 0, 235, 111 |
| hue preserving mapping strategy | 0, 245, 122 |
| luminance preserving mapping strategy | 0, 201, 201 |
| solid/saturation preserving mapping strategy | 0, 199, 220 |

The printer 12 applies the weights obtained at step 130 (i.e., 0.90, 0.10, 0, 0) to each of the R, G, B values of each color mapped second color. For instance, to determine the weighted average of the R values, the printer 12 performs the following calculation:

$$W_i(R)=(0.90)*0+(0.10)*0+(0)*0+(0)*0=0$$

For the G values, the printer 12 performs the following calculation:

$$W_i(G)=(0.90)*235+(0.10)*245+(0)*201+(0)*199=236$$

For the B values, the printer 12 performs the following calculation:

$$W_i(B)=(0.90)*112+(0.10)*122+(0)*201+(0)*220=113$$

Therefore, the blended color value (R, G, B) based on the set of weights in this example is 0, 236, 113.

In other embodiments of the present invention where the intents in the file 42 are specified along with corresponding Boolean values, the printer 12 calculates an average of the R, G, B values of each color mapped second color associated with the intents (i.e., colorimetric, hue, luminance and solid/saturation preservation) which correspond to a "true" Boolean value, for example. In other embodiments where the desired intents are specified without any value while the undesired intents are omitted, the printer 12 obtains an average of the R, G, B values of just the color mapped second colors which are associated with the intents specified in the file 42. Of course, these schemes for specifying values with the intents, such as weights, Boolean values or no values, may be combined. For example, the printer 12 may be configured to interpret intents associated with a Boolean value of "true" as having a weight of 1.0, while intents associated with a value of "false" should be interpreted as 0.0.

At step 160, the printer 12 replaces the original color specification of the first selected color associated with the portion of the document 40 being processed for printing with the blended color value obtained at step 150, and stores the processed portion with the modified color specification in the printer memory 22 in accordance with the printer's particular rendering process (e.g., rasterization).

At step 165, the printer 12 determines whether there are any more portions of the document 40 which require processing for printing. If there are, then the YES branch is followed and steps 110-165 are repeated in the same manner described above, except other first colors from the particular portions of the document 40 being processed for printing are selected for color gamut mapping as they are encountered during processing. Furthermore, the same or different sets of color gamut mapping intents from the intent file 42 are used depending on which one of the objects 50, 52, 54 the selected first color is associated with as mentioned above at step 110. When there are no remaining portions of the document 40 which require processing for printing, the NO branch is followed.

At step 170, the printer 12 retrieves the processed portions of the document 40 with the blended colors from the printer memory 22, prints a color blended document 44 as shown in FIG. 1, and the process ends.

An alternative operation of the system 10 for device-independent color gamut mapping will now be described in accordance with embodiments of the present invention. Steps 100-170 are performed as described above in connection with other embodiments, except at step 130 the weights associated with the color gamut mapping intents included in the intent file 42 provided to the computer 12 are not explicitly specified values but instead are specified as functions from which the printer 12 determines the actual weight values.

Thus, the printer 12 determines the weight values for each of the intents (i.e., calorimetric, hue, luminance, and solid/saturation preservation) based on a function of the first color value from the portion of the document being processed (e.g., wi=Wi(R, G, B)), although the printer 12 may determine the weight values for each of the mapping strategies based on a function of the position of the first color value (e.g., wi=Wi(x,y)), the printer 12 may determine the weights based on a function of the first color value and the particular position of the first color value (e.g., wi=Wi(R(x,y),G,(x,y), B(x,y))), the printer 12 may determine the weights based on a function of first color values from a neighborhood of a position from where first color value is from (e.g., wi=Wi (R(x,y),G,(x,y),B(x,y),R(x−1,y),G,(x−1,y),B(x−1,y))), or the printer 12 may determine the weights based on a function of the objects 50, 52, 54 associated with the first color being processed, such as a function of the object type of the object (e.g., wi=Wi(o)).

With the present invention, users, such as document authors, are given greater control over the color gamut mapping process during document rendering. Control over the color gamut mapping for a document may be specified down to the pixel level and done so in a device-independent way. It should be appreciated that while the exemplary embodiments of the present invention have been described in connection with using sets of a specified linear combination of intents for device-independent color gamut mapping, specified linear combinations of intents for other document processing needs in a device-independent manner may be used, such as a specified linear combination of intents for UCR/GCR processing or halftone selection.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method comprising:
defining a finite set of document rendering intents as a basis for document rendering;
expressing at least one desired document rendering strategy comprising a first combination of the document rendering intents; and
associating the at least one desired document rendering strategy with at least one rendering decision associated with a document,
wherein the defining a finite set of document rendering intents further comprises defining a finite set of color gamut mapping intents, wherein the expressing at least one desired document rendering strategy further comprises expressing at least one desired color gamut mapping strategy comprising a second combination of the gamut mapping intents, and wherein the associating the at least one desired document rendering strategy with at least one rendering decision associated with a document further comprises associating the at least one desired color gamut mapping strategy with at least one color in an input color gamut associated with the document.

2. The method as set forth in claim 1 wherein the expressing at least one desired color gamut mapping strategy comprising a combination of the gamut mapping intents further comprises providing a weight for each of the gamut mapping intents.

3. The method as set forth in claim 2 further comprising determining values for the weights based upon at least one of the color, a position of the color within the document, the color at a particular position within the document, the color in a region of the document, and an object within the document that is associated with the color.

4. The method as set forth in claim 1 wherein the color gamut mapping intents comprise a colorimetric preserving intent, a hue preserving intent, a luminance preserving intent, or a saturation preserving intent.

5. The method as set forth in claim 1 further comprising:
identifying the finite set of document rendering intents at a rendering device, wherein a document rendering method is implemented by the rendering device for each of the document rendering intents; and obtaining the associated desired document rendering strategy associated with the at least one rendering decision.

6. The method as set forth in claim 5 further comprising:

performing the document rendering methods for each of the at least one rendering decision to obtain a plurality of intermediate rendering results for each rendering decision; and constructing a final rendering result for each of the at least one rendering decision by combining the intermediate rendering results according to the first combination specified in the desired document rendering strategy associated with the rendering decision.

7. The method as set forth in claim 5 wherein the identifying the finite set of document rendering intents at a rendering device further comprises identifying a finite set of color gamut mapping intents as a basis for performing color gamut mappings, wherein a color mapping method is implemented by the rendering device for each of the color gamut mapping intents, and wherein the obtaining the associated desired document rendering strategy associated with the at least one rendering decision further comprises determining for at least one color in the document a desired color gamut mapping strategy comprising a second combination of the identified color gamut mapping intents.

8. The method as set forth in claim 7 further comprising:

performing the color mapping methods for each of the at least one color to obtain a plurality of basis color maps for each color; and constructing a mapped color for each of the at least one color by combining the basis color maps according to the second combination specified in the desired color gamut mapping strategy associated with the color.

9. The method as set forth in claim 8 wherein the constructing a mapped color for each of the at least one color by combining the basis color maps according to the second combination specified in the desired color gamut mapping strategy associated with the color further comprises:

determining a weighted average of the basis color maps for the mapped color using a weight provided for each of the gamut mapping intents.

10. A computer-readable medium having stored thereon instructions, which when executed by at least one processor, causes the processor to perform:

defining a finite set of document rendering intents as a basis for document rendering;

expressing at least one desired document rendering strategy comprising a first combination of the document rendering intents; and associating the at least one desired document rendering strategy with at least one rendering decision associated with a document, wherein the defining a finite set of document rendering intents further comprises defining a finite set of color gamut mapping intents, wherein the expressing at least one desired document rendering strategy further comprises expressing at least one desired color gamut mapping strategy comprising a second combination of the gamut mapping intents, and wherein the associating the at least one desired document rendering strategy with at least one rendering decision associated with a document further comprises associating the at least one desired color gamut mapping strategy with at least one color in an input color gamut associated with the document.

11. The medium as set forth in claim 10 wherein the expressing at least one desired color gamut mapping strategy comprising a combination of the gamut mapping intents further comprises providing a weight for each of the gamut mapping intents.

12. The medium as set forth in claim 11 further comprising determining values for the weights based upon at least one of the color, a position of the color within the document, the color at a particular position within the document, the color in a region of the document, and an object within the document that is associated with the color.

13. The medium as set forth in claim 10 wherein the color gamut mapping intents comprise a colorimetric preserving intent, a hue preserving intent, a luminance preserving intent, or a saturation preserving intent.

14. The medium as set forth in claim 10 further comprising:

identifying the finite set of document rendering intents at a rendering device, wherein a document rendering method is implemented by the rendering device for each of the document rendering intents; and obtaining the associated desired document rendering strategy associated with the at least one rendering decision.

15. The medium as set forth in claim 14 further comprising:

performing the document rendering methods for each of the at least one rendering decision to obtain a plurality of intermediate rendering results for each rendering decision; and constructing a final rendering result for each of the at least one rendering decision by combining the intermediate rendering results according to the first combination specified in the desired document rendering strategy associated with the rendering decision.

16. The medium as set forth in claim 14 wherein the identifying the finite set of document rendering intents at a rendering device further comprises identifying a finite set of color gamut mapping intents as a basis for performing color gamut mappings, wherein a color mapping method is implemented by the rendering device for each of the color gamut mapping intents, and wherein the obtaining the associated desired document rendering strategy associated with the at least one rendering decision further comprises determining for at least one color in the document a desired color gamut mapping strategy comprising a second combination of the identified color gamut mapping intents.

17. The medium as set forth in claim 16 further comprising:

performing the color mapping methods for each of the at least one color to obtain a plurality of basis color maps for each color; and constructing a mapped color for each of the at least one color by combining the basis color maps according to the second combination specified in the desired color gamut mapping strategy associated with the color.

18. The medium as set forth in claim 17 wherein the constructing a mapped color for each of the at least one color by combining the basis color maps according to the second combination specified in the desired color gamut mapping strategy associated with the color further comprises:

determining a weighted average of the basis color maps for the mapped color using a weight provided for each of the gamut mapping intents.

19. A system comprising:
a document rendering intention system that defines a finite set of document rendering intents as a basis for document rendering;
a rendering intention expression system that expresses at least one desired document rendering strategy comprising a first combination of the document rendering intents; and
an intention matching system that associates the at least one desired document rendering strategy with at least one rendering decision associated with a document,
wherein the document rendering intention system defines a finite set of color gamut mapping intents, wherein the rendering intention expression system expresses at least one desired color gamut mapping strategy comprising a second combination of the gamut mapping intents, and wherein the intention matching system associates the at least one desired color gamut mapping strategy with at least one color in an input color gamut associated with the document.

20. The system as set forth in claim 19 wherein the rendering intention expression system provides a weight for each of the gamut mapping intents.

21. The system as set forth in claim 20 further comprising a weight value determination system that determines values for the weights based upon at least one of the color, a position of the color within the document, the color at a particular position within the document, the color in a region of the document, and an object within the document that is associated with the color.

22. The system as set forth in claim 19 wherein the color gamut mapping intents comprise a colorimetric preserving intent, a hue preserving intent, a luminance preserving intent, or a saturation preserving intent.

23. The system as set forth in claim 19 further comprising:
a document rendering system that identifies the finite set of document rendering intents at a rendering device, wherein a document rendering method is implemented by the rendering device for each of the document rendering intents; and
a rendering strategy system that obtains the associated desired document rendering strategy associated with the at least one rendering decision.

24. The system as set forth in claim 23 wherein the document rendering system performs the document rendering methods for each of the at least one rendering decision to obtain a plurality of intermediate rendering results for each rendering decision and constructs a final rendering result for each of the at least one rendering decision by combining the intermediate rendering results according to the first combination specified in the desired document rendering strategy associated with the rendering decision.

25. The system as set forth in claim 23 wherein the document rendering system identifies a finite set of color gamut mapping intents as a basis for performing color gamut mappings, wherein a color mapping method is implemented by the rendering device for each of the color gamut mapping intents, and wherein the rendering strategy system determines for at least one color in the document a desired color gamut mapping strategy comprising a second combination of the identified color gamut mapping intents.

26. The system as set forth in claim 25 wherein the document rendering system performs the color mapping methods for each of the at least one color to obtain a plurality of basis color maps for each color and constructs a mapped color for each of the at least one color by combining the basis color maps according to the second combination specified in the desired color gamut mapping strategy associated with the color.

27. The system as set forth in claim 26 wherein the document rendering system determines a weighted average of the basis color maps for the mapped color using a weight provided for each of the gamut mapping intents.

* * * * *